United States Patent [19]
Thompson-Oram

[11] Patent Number: 5,435,215
[45] Date of Patent: Jul. 25, 1995

[54] ORNAMENTAL TURNING DEVICE

[76] Inventor: Martin Thompson-Oram, 2 Rakehill Road, Barwick-in-Elmet Leeds LS15 4JL, Great Britain

[21] Appl. No.: 162,092

[22] PCT Filed: Jun. 11, 1992

[86] PCT No.: PCT/GB92/01054
§ 371 Date: Dec. 10, 1993
§ 102(e) Date: Dec. 10, 1993

[87] PCT Pub. No.: WO92/22435
PCT Pub. Date: Dec. 23, 1992

[30] Foreign Application Priority Data

Jun. 12, 1991 [GB] United Kingdom ............. 9112662

[51] Int. Cl.⁶ .................. B23B 3/28; B27C 7/00
[52] U.S. Cl. .................... 82/19; 82/152; 142/1; 142/12; 142/55
[58] Field of Search ........... 82/19, 18, 152, 154; 142/1, 6, 7, 12, 13, 38, 39, 55; 30/162, 164.6, 164.7, 277, 277.4, 362; 83/582, 586, 697, 752; 173/81, 83, 151

[56] References Cited

U.S. PATENT DOCUMENTS

| 57,158 | 8/1866 | Linniatt | 82/19 |
| 64,420 | 5/1867 | Holroyd | 82/19 |
| 281,539 | 7/1883 | Marshall | 82/19 |
| 1,874,470 | 8/1932 | Drissner | 82/19 |
| 1,879,201 | 9/1932 | Groene | 82/19 |
| 4,646,595 | 3/1987 | Slee | 82/19 |
| 5,181,442 | 1/1993 | Nezu | 82/19 |

FOREIGN PATENT DOCUMENTS

| 2131523 | 1/1973 | Germany | 82/18 |
| 344425 | 5/1931 | United Kingdom | 82/19 |
| 468379 | 7/1937 | United Kingdom | 82/19 |

Primary Examiner—Steven C. Bishop
Attorney, Agent, or Firm—Madson & Metcalf

[57] ABSTRACT

An ornamental turning device (10) comprises a shaft (11) on which is mounted a work to be decorated. The device (10) also comprises tool drive means (5) for driving a tool (7) for decorating the work (9). The driving mechanism (5) ensures that the reciprocating blade of tool (7) reciprocates at a rate proportional to the rate of rotation of the shaft (11).

22 Claims, 5 Drawing Sheets

ORNAMENTAL TURNING DEVICE

This invention relates to an ornamental turning device and to a tool drive mechanism and a tool for such an ornamental turning device.

An ornamental turning device of this type may be used to engrave a pattern in an object, for example a wooden goblet, which has been worked upon a lathe.

It is known to engrave a pattern on an object such as a goblet by hand. For a pattern which repeats itself around the circumference or perimeter of the object, it is necessary to make accurate measurements of the circumference of the object and then to mark the surface of the object at the precise points at which it will be necessary to make cuts in the object. Such a process is time consuming and requires a high level of skill.

According to a first aspect of the invention: there is provided an ornamental turning device comprising:

a rotatable shaft adapted to receive a chuck at a first end;

a tool for engraving an object attachable to the chuck, and comprising a reciprocating blade; and tool drive means driveably connectable to the shaft for driving the tool, whereby in use, the rate at which the blade reciprocates is proportional to the rotational speed of the shaft.

By means of the device according to the invention, an object which has been worked on a lathe, may be engraved whilst still in place on the lathe.

By linking the rate of reciprocation of the blade of the tool with the rotational speed of the shaft on which the object to be engraved is mounted by means of the chuck, the spacing of cuts formed by the tool is linked to the circumferential measurement of the object. This ensures that grooves are regularly spaced around the circumference.

Preferably, the device further comprises a tool rest which ensures that the position of the tool in a plane at right angles to the axis of rotation of the shaft remains substantially constant. The shaft may be orientated at any convenient position, but generally it will have a horizontal axis of rotation. The tool rest may then comprise a substantially horizontal surface on which the tool may rest. The horizontal movement of the tool may then be dictated by the operator, whilst the vertical position of the tool remains substantially constant.

Advantageously, the tool should approach the work piece radially to its axis of rotation. The tool rest should therefore be tiltable in two directions in order that diamonds or "lattice work" grooves be produced.

Alternatively, the tool may be held on the tool rest by mechanical means, which mechanical means determine the horizontal movement of the tool.

The extent of horizontal movement of the tool will determine the length of the cut produced in the object by the tool.

Preferably, the device comprises a driving cog connectable to the shaft, and the tool drive means comprises:

a driven cog driveably connectable to the driving cog;

at least one cam rotatable with the driven cog, which cam comprises at least one lobe;

a cam follower adapted to follow the surface of the at least one cam; and means for connecting the tool to the cam follower, whereby reciprocation of the blade is determined by the movement of the cam follower over the cam surface.

According to a second aspect of the invention there is provided a tool drive means comprising:

a driven cog;

at least one cam rotatable with the driven cog, which cam comprises at least one lobe;

a moveable cam follower which follows the surface of the at least one cam: and means for connecting a tool to the cam follower, whereby reciprocation of a blade of the tool is determined by movement of the cam follower.

Preferably, the driving cog is positioned on the shaft on which the object to be worked is positioned. In alternative arrangements however, the driving cog may be positioned on a separate shaft and connected to the shaft.

Preferably, the driving and driven cogs are connected to one another by means of a drive belt, chain, or intermediate cog, etc.

The at least one lobe comprises a concave surface in the surface of the cam. The presence of the lobe therefore causes the cam follower to move radially towards the centre of the cog. This radial movement of the cam follower causes a reciprocating movement of the blade of the tool.

The ratio of the number of teeth on the driving cog to the number of teeth on the driven cog, in conjunction with the number, size and position of the lobes on the cam, governs the number, depth and length of cuts around the circumference of the object, in a given pattern.

The tool may be connected to the cam follower by any convenient means, for example hydraulic or pneumatic links. Preferably however, the tool is connected by means of a flexible cable.

Preferably, the cam follower comprises a pivoted elongate member having a ball race at one end, for following the surface of the cam, and is pivoted at an opposite end. The flexible cable may then be connected to the elongate member. Thus, when the ball race of the cam follower follows the surface of a lobe, the ball race will move towards the centre of the cog. This causes the elongate member to pivot about the pivot point, and causes the cable to release the blade outwardly under action of spring in tool. The cam follower may be pivoted on a shaft to allow for selection of the cam by moving the follower laterally.

Advantageously, the tool comprises; a housing having a front open end and a back open end: a cutting blade moveably positionable within the housing and having a cutting position in which the blade protrudes through the front open end of the housing, and a non-cutting position in which the blade has retracted some distance within the housing; means for connecting the tool to the drive means; and biasing means for biasing the tool in the cutting position.

According to a third aspect of the invention there is provided a cutting tool comprising: a housing having a front open end and a back open end; a cutting blade moveably positionable within the housing and having a cutting position in which the blade protrudes through the first end of the housing and a non-cutting position in which the blade has retracted some distance within the housing; means for connecting the tool to the drive means; and biasing means fop biasing the tool in the cutting position.

In use as the cam follower follows the surface of the rotating cam, the cutting tool will be biased to the cutting position wherein a first end of the cutting blade protrudes through the first end of the housing when the follower meets a lobe on the cam. The biasing means causes the blade to remain in this position. When the cam follower tracks the non-lobe surface of the cam, the elongate member of the cam follower will cause the cable to pull the cutting blade into the non-cutting position in which the blade does not touch the work. The biasing means will ensure that the blade returns to the cutting position at the next lobe.

Advantageously, the position of the cable relative to the ball race and pivot end of the elongate member of the cam follower is variable. This enables the sensitivity of the device to be varied. For example, the nearer the cable is attached to the pivot point of the elongate member, the smaller will be the distance travelled by the cable end. Equally, the nearer the cable end is attached to the ball race, the further will be the distance travelled by the cable end when the ball race tracks into a lobe on the cam.

Preferably, the driving means comprises a plurality of cams. Each cam may have a different arrangement of lobes. For example, the lobes on one cam may be offset relative to the lobes on a neighbouring cam. The number and/or shape of the lobes may also vary from cam to cam. The different arrangements of lobes on each cam allows the spacing and/or shape of the cuts to be varied, and thus allows the more intricate pattern of engraving to be developed.

Embodiments of the invention will now be described by way of example only with reference to the accompanying drawings in which.

Figure 1:
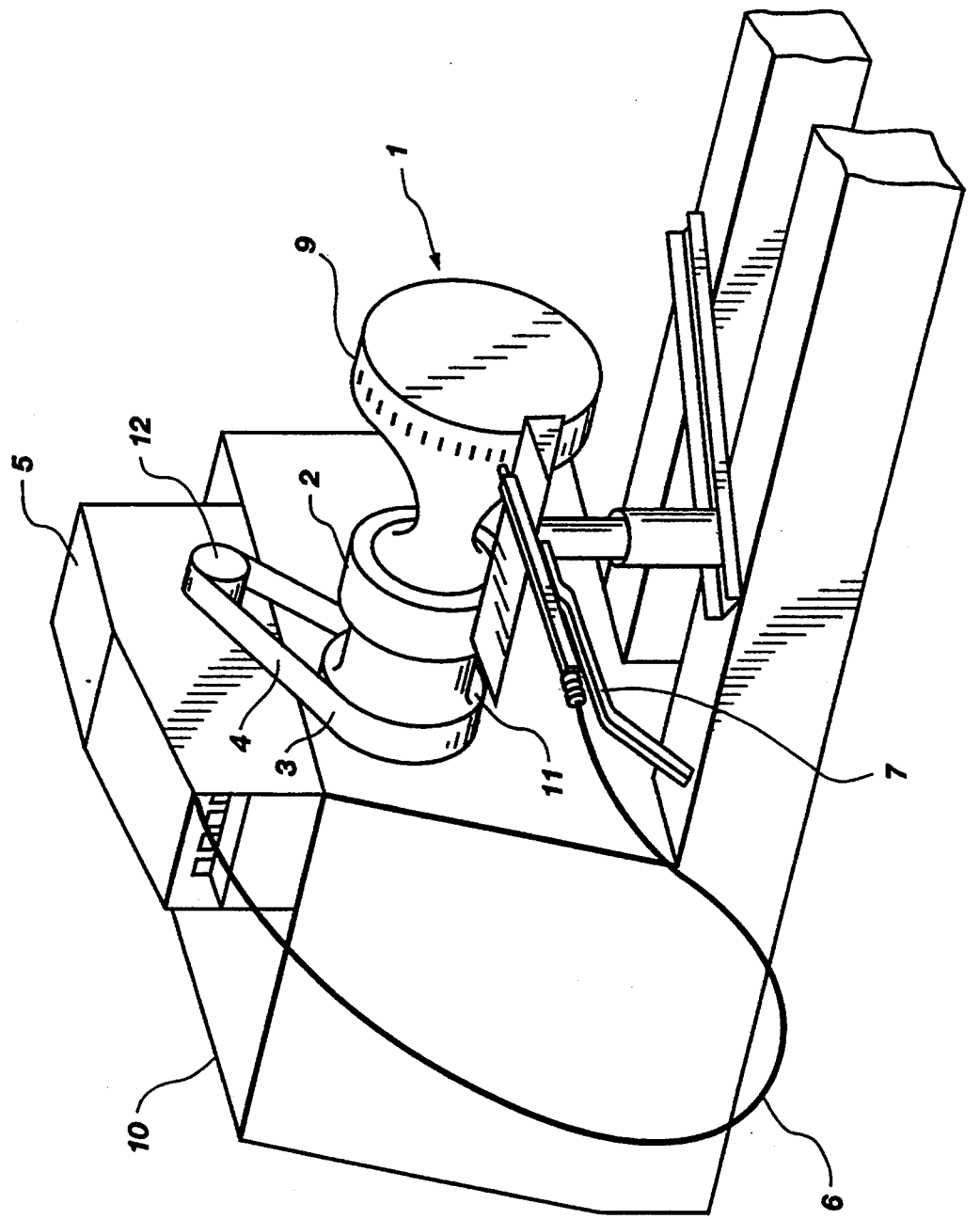
FIG. 1 is a schematic representation of an ornamental turning device according to the first aspect of the invention including tool drive means according to the second aspect of the invention and a tool according to the third aspect of the invention.

Referring to FIG. 1, an ornamental turning device according to the first aspect of the invention is designated generally by the reference numeral 10. The device 10 comprises a shaft 11 which forms part of a lathe 1. Mounted on one end of the shaft 11 is a standard chuck 2 for holding the work 9 to be decorated. In this example, the work 9 comprises a wooden goblet. The device 10 further comprises tool drive means 5 comprising a tool drive mechanism, for driving a tool 7 which in this example is designed to be hand held.

The tool 7 comprises a reciprocating blade which is controlled by a flexible cable 6. The drive mechanism 5 ensures that the blade of the tool 7 reciprocates at a rate proportional to the rate of rotation of the shaft 11 in a manner to be described herein. Around the shaft 11 is positioned a driving cog 3 which in this example comprises 44 teeth. The drive mechanism 5 comprises a driven cog 12 which in this example comprises 20 teeth. The two cogs 3, 12 are drivingly connected to one another by means of a drive belt 4. The driven cog 12 causes a cam arrangement 35 (FIG. 2) to rotate.

Figure 2:
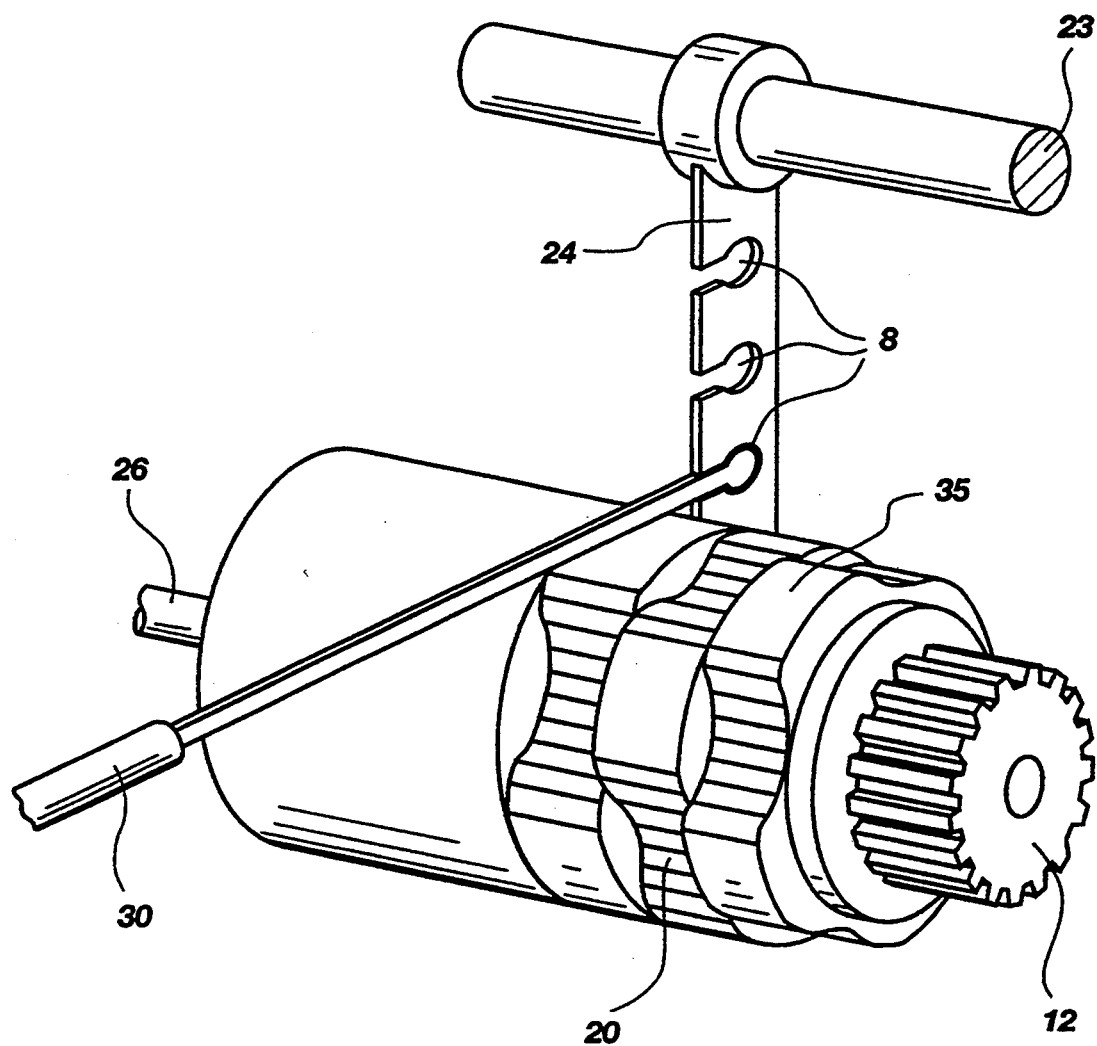
FIG. 2 is a schematic diagram of the driven cog and cam arrangement of the drive means of FIG. 1.
Figure 3:
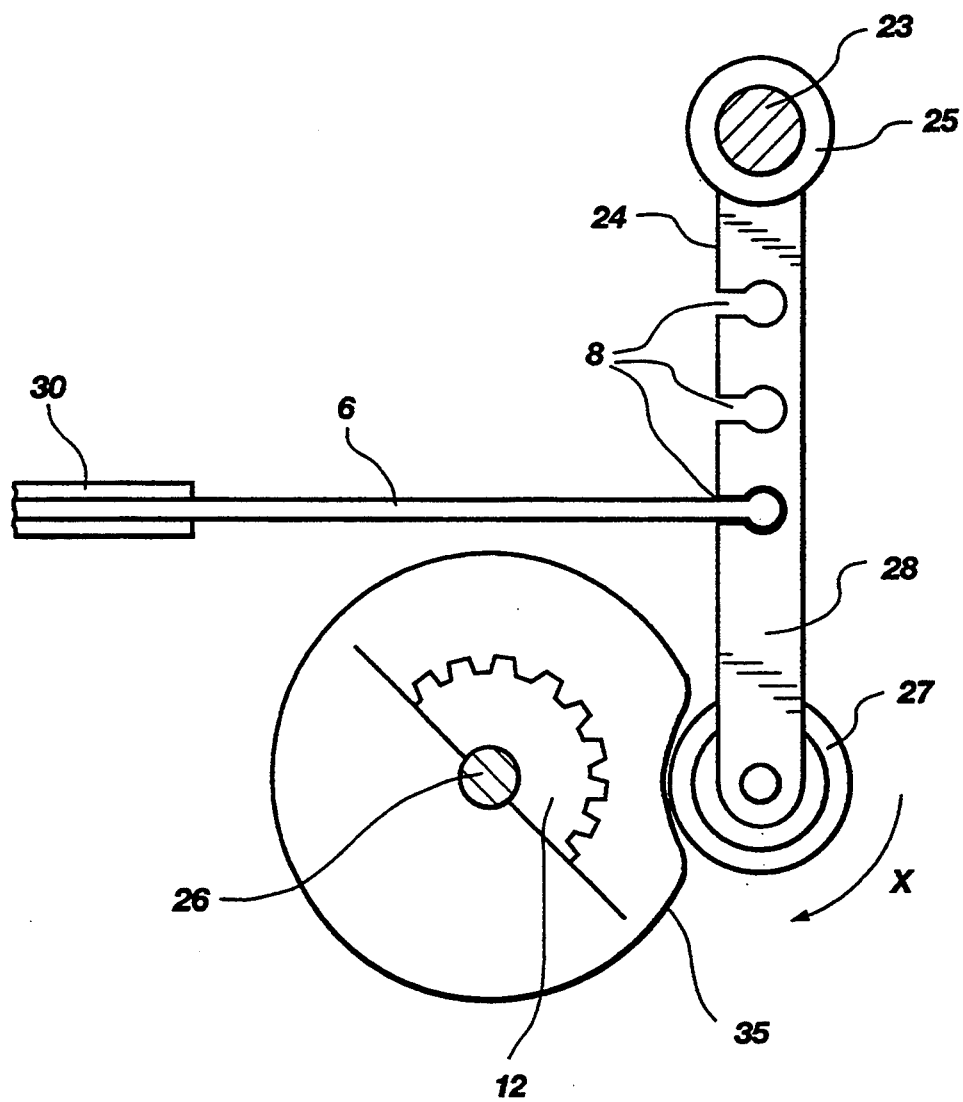
FIG. 3 is a cross-sectional representation of the arrangement of FIG. 2.

Referring now to FIGS. 2 and 3, the tool drive mechanism will be described in more detail. The driven cog 12 causes a cam arrangement 35 to rotate with the driven cog 12 about cam shaft 26. The cam arrangement 35 may comprise one or more cams, and in this example it comprises three cams. Each cam comprises one or more lobes 20 which comprise concave surfaces extending inwardly. The tool drive mechanism 5 also comprises a cam follower 24 which is pivoted about a shaft 23.

Referring to FIG. 3, the cam follower is shown in more detail. The cam follower 24 comprises a pivoted end 25 spaced apart from a ball race 27 by an elongate member 28. The ball race 27 follows the surface of the cam as it rotates with the driven cam, due to the rotation of the driving cog 3. The presence of a lobe causes ball race 27 to move towards the centre of the cog in a direction indicated by arrow X in FIG. 3 in order to follow the surface of the cam. This in turn causes the cam follower 24 to pivot about pivot end 25. The cam follower is connected to the tool 7 (FIG. 4) by means of a flexible cable 6. The cable 6 is connected to the elongate member 28 of the cam follower 24 at a cable pick up point 8. The position of the cable on the elongate member 28 may be varied by fixing the cable end in any one of the three cable pick up points present in the example of FIG. 3. The relative position of the cable end determines the sensitivity of the device 10. For example if the cable is connected in the cable pick up point which is positioned relatively close to the ball race, the pick up point will move a relatively greater distance than a cable pick up point positioned nearer to the pivot end 25 of the cam follower 24. The flexible cable 6 is longitudinally slidable within cable sheath 30.

Figure 4:
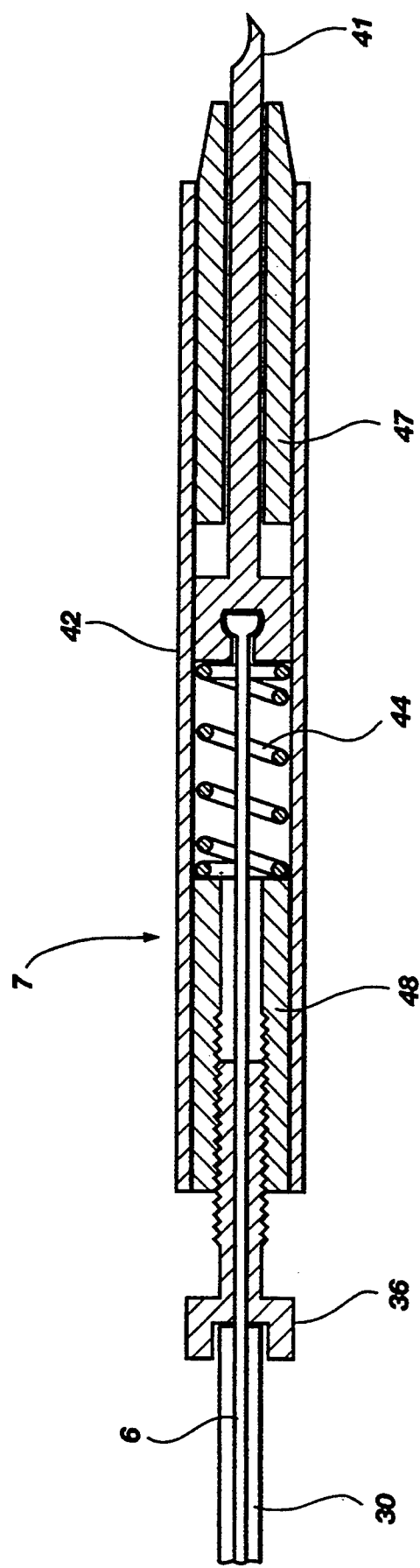
FIG. 4 is a schematic diagram of the tool shown in FIG. 1.

Referring now to FIG. 4, the tool 7 is shown in more detail. The tool comprises a housing 42 in which is moveably positioned a cutting blade 41. The cutting blade may move between a cutting position as shown in FIG. 4 wherein the blade protrudes beyond the housing, and a non-cutting position wherein the blade has retracted the distance of cable movement within the housing. The blade 41 is connected to the flexible cable 6 at an end remote from the cutting blade end. The blade is guided during its movement by a tool tip guide 47. A spring 44 biassed the blade in the operating position. A cable adjuster 36 allows the tension in the cable to be varied to suit the operating conditions.

In use, when the driven cog 12 is being caused to rotate by the driving cog 3, and thus causing the cam shaft and therefore the cams to rotate, the cam follower will follow the surface of the cam. The presence of a lobe will cause the ball race 27 to move radially inwardly under the action of the spring 44 to extend the cutting blade into its operating position. When the lobe has passed by the cam follower 24, the cable 6 will ensure that the blade returns to its non operating position. As the cam rotates, this action will be repeated causing the blade to reciprocate. The cam may include more than one lobe, and the ratio of the teeth on the driving cog to that of the teeth on the driven cog in conjunction with the number of lobes on the cam determines the rate of reciprocation on the blade 41.

In this example, there are three cams present in the cam arrangement 35. It is possible to position the cam follower to follow any one of three cams. As can be seen from FIG. 2, the lobes on each of the three cams are offset from one another, and this allows different spacing and positionings of the cuts on the object to be decorated. This allows an elaborate pattern to be built up using the cutting tools 41.

Referring to FIG. 4, the cutting blade 41 of the tool 7 is interchangeable, and may be changed to suit the particular application. The back of the cutting blade 41 and the cable adjuster guide 48 serve as abutment means for the spring 44.

The following table shows the relationship between the number of teeth in both the driven and driving cogs, the number of positions of tool advanced per lobe of cam around the work, the number of revolutions of work taken to produce this number of positions and therefore the number of incisions possible from various numbers of lobes on a cam.

TABLE 1

| Drive | Driven | No of positions of tool advances per lobe of cam around work | No of revolutions of work taken to perform same | No of incision possible from: | | | |
|---|---|---|---|---|---|---|---|
| | | | | 2 Lobes | 3 lobes | 4 lobes | 6 lobes |
| 44 | 10 | 22 | 5 | 44 | 66 | 88 | 132 |
| | 12 | 11 | 3 | 22 | 33 | 44 | 66 |
| | 13 | 44 | 13 | 88 | 132 | 176 | 264 |
| | 14 | 22 | 7 | 44 | 66 | 88 | 132 |
| | 15 | 44 | 15 | 88 | 132 | 176 | 264 |
| | 16 | 11 | 4 | 22 | 33 | 44 | 66 |
| | 17 | 44 | 17 | 88 | 132 | 176 | 264 |
| | 18 | 22 | 9 | 44 | 66 | 88 | 132 |
| | 20 | 11 | 5 | 22 | 33 | 44 | 66 |
| | 21 | 44 | 21 | 88 | 132 | 176 | 264 |

For a given cam lobe profile, the fewer teeth on the driven cog, the shorter the angle of rotation of the work covered by each advance of the cutter.

The extent of the lobe determines the dwell angle and the depth of the lobe determines the lift.

The amount of lift on a cam and the dwell angle of the lobe or lobes in conjunction with the gearing ratio between the driving and driven cogs and the drive pick up point on the cam follower together govern the number, length and depth of cuts made by the tool 7 in any given pattern.

Lobes on the same cam can be cut with differing lifts and dwell angles offering long and short cuts or deep and shallow cuts. Cams can be fitted relative to each other in order that they will be "out of phase" i.e. form a cut between two previous cuts which have been formed when the cam follower is following a first cam. Thus, by having a plurality of cams, the possible number of cuts on a perimeter of a work to be decorated is increased, and other variations such as dimples between flutes are possible.

For example, the cam follower may be in a position to follow a first cam, which results in the tool creatinng cuts on the work having a first spacing. The cam follower may then be moved to track a second cam, which may result in cuts being formed in the space between adjacent cuts in the first set of cuts.

The horizontal position of the tool is governed by the operator, or mechanically, and the vertical position of the tool is substantially controlled due to the tool rest on which the tool is positioned, which may be horizontal or tilted in one plane.

To illustrate the invention, when the ratio of the driving to driven cogs is 2.2 to 1, a cam with one lobe produces 11 cuts per 5 revolutions of the work. All these cuts are positioned equidistant from one another circumferentially. The profile which the tool will cut is governed by the profile of the cam and the drive take up point on the cam follower. The depth of cut is also governed by the position of the tool in relation to the work.

Typically, the work will rotate at a speed within the range of 250 rpm and 500 rpm approximately. In order for the operator to see the pattern developing a stroboscopic light triggered by the rotation of the shaft may be used.

Figure 5:
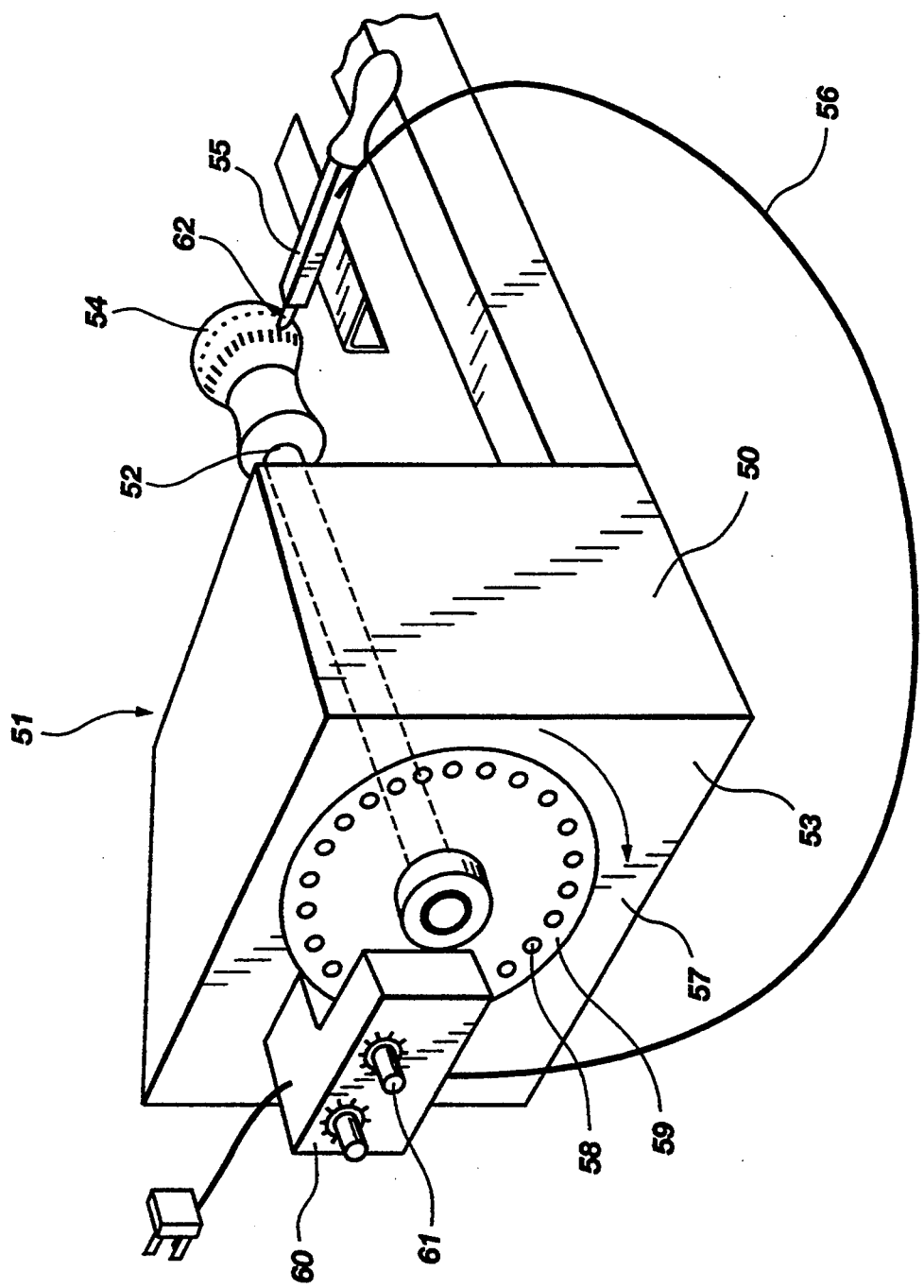
FIG. 5 is a schematic diagram of a second embodiment of the invention.

Referring to FIG. 5 a second embodiment of the invention incorporating a control box 50 is shown. The ornamental turning device 51 comprises a shaft 52, which forms part of a lathe. Mounted on one end of the shaft 52 is a standard chuck (not shown) for holding the work 54 to be decorated. In this example the work 54 comprises a wooden goblet. The device 51 further comprises a tool drive mechanism for driving tool 55, which in this example is designed to be hand held.

The tool 55 comprises a reciprocating blade which is controlled by a flexible cable 56. The control box 57 ensures that the blade of the tool 55 reciprocates at a rate proportional to the rate of rotation of the shaft 11, in a manner to be described below.

The drive mechanism 53 comprises an infra red sensor (not shown), which detects the rotational position of the work piece by means of a series of holes 58 in a disc 59 which is mounted on the same shaft 52 as the work 54. The information relating to the rotational position of the work piece 54 is processeed by a microprocessor 60, which is programmed by the operator using the controls 61 on the control box 50, to energise a solenoid (not shown) which is positioned within the body of the hand held tool 55. This both propels and withdraws the cutter 62 which is mounted at the end of the tool, towards and away from the work piece 54 at predetermined intervals around the circumference of the work piece 54 as it rotates. The speed of rotation is between 250 rpm and 400 rpm approximately.

In use it allows the operator to decorate work in the same manner as with a device described with reference to FIGS. 1 to 4, which is a purely mechanical device. However there is an added advantage that the operator is able to vary the position and number and length of cuts per circumference as desired. In other words, it is possible to make a series of cuts, for example, on only one side of a piece of work instead of all the way Pound the circumference of that piece of work, or to make groups of cuts having any desired space between the group.

I claim:

1. An ornamental turning device comprising:
   a shaft adapted to receive a chuck at a first end and being rotatable about an axis of rotation;
   a tool for engraving an object attachable to the chuck and comprising a reciprocating blade;

a driving cog connected to the shaft;
tool drive means driveably connected to the shaft of the driving the tool, the drive means comprising:
- a driven cog driveably connected to the driving cog;
- at least one cam rotatable with the driven cog, which cam comprises at least one lobe;
- a moveable cam follower adapted to follow the surface of the at least one cam; and
- a flexible cable for connecting the tool to the cam follower, whereby reciprocation of the blade is determined by the movement of the cam follower over the cam surface and whereby in use, the rate at which the blade reciprocates is proportional to the rotational speed of the shaft, and whereby when the cam follower tracks a lobe surface of the cam, the tool is in contact with an object to be worked, and when the cam follower tracks a non-lobe surface, the tool is out of contact with the object.

2. An ornamental turning device according to claim 1 further comprising a tool rest for maintaining the position of the tool substantially constant in a plane at a right angle to the axis of rotation of the shaft.

3. An ornamental turning device according to claim 2 wherein the shaft has a substantially horizontal axis of rotation.

4. An ornamental turning device according to claim 3, wherein the driving cog and the driven cog are connected to one another by means of a drive belt.

5. An ornamental turning device according to claim 4, wherein the at least one lobe comprises a concave surface in the surface of the cam.

6. An ornamental turning device according to claim 5, wherein the cam follower comprises a pivoted elongate member having a ball race at one end for following the surface of the cam, and is pivoted at an opposite end.

7. An ornamental turning device according to claim 6, wherein the pivoted elongate member further comprises a plurality of cable pick up points for attachment of the flexible cable to the cam follower.

8. An ornamental turning device according to claim 6, wherein the tool comprises:
- a housing having a front open end and a back open end;
- a cutting blade movably positioned within the housing, and having a cutting position in which the blade protrudes through the front open end of the housing, and a noncutting position in which the blade retracts a distance within the housing;
- means for connecting the tool to the tool drive means; and
- means for biasing the tool in the cutting position.

9. An ornamental turning device according to claim 8, wherein the means for connecting the tool to the tool drive means comprises a cable, and wherein the position of the cable relative to the ball race and pivot end of the elongate member of the cam follower is variable.

10. A tool drive means comprising:
- a driven cog driveably connected to a driving cog;
- at least one cam rotatable with the driven cog, which cam comprises a plurality of lobes;
- a moveable cam follower adapted to follow the surface of the at least one cam; and
- a flexible cable for connecting a tool to the cam follower, said tool including a reciprocating blade, whereby reciprocation of the blade is determined by movement of the cam follower over the cam surface and whereby in use, the rate at which the blade reciprocates is proportional to the rotation speed of the shaft, and whereby when the cam follower tracks a lobe surface of the cam, the tool is in contact with an object to be worked, and when the cam follower tracks a non-lobe surface, the tool is out of contact with the object.

11. A tool drive means according to claim 10, wherein the driving cog and the driven cog are connected to one another by means of a drive belt.

12. A tool drive means according to claim 11, wherein the at least one lobe comprises a concave surface in the surface of the cam.

13. A tool drive means according to claim 12 wherein the cam follower comprises a pivoted elongate member having a ball race at one end for following the surface of the cam, and is pivoted at an opposite end.

14. An ornamental turning device according to claim 13, wherein the pivoted elongate member further comprises a plurality of cable pick up points for attachment of the flexible cable to the cam follower.

15. A tool drive means according to claim 13, wherein the tool comprises:
- a housing having a front open end and a back open end;
- a cutting blade movably positioned within the housing, and having a cutting position in which the blade protrudes through the front open end of the housing, and a noncutting position in which the blade retracts a distance within the housing;
- means for connecting the tool to the drive means; and
- means for biasing the tool in the cutting position.

16. A tool drive means according to claim 15, wherein the means for connecting the tool to a drive means comprises a cable, and wherein the position of the cable relative to the ball race and pivot end of the elongate member of the cam follower is variable.

17. A tool drive means according to claim 15, wherein the driving means comprises a plurality of cams.

18. A cutting tool comprising:
- a housing having a front open end and a back open end;
- a cutting blade movably positioned within the housing and having a cutting position in which the blade protrudes through the front end of the housing, and a noncutting position in which the blade retracts a distance within the housing;
- means for connecting the tool to a drive means;
- means for biasing the tool in the cutting position.

19. A cutting tool according to claim 18, wherein the means for connecting the tool to a drive means comprises a cable, and wherein reciprocating movement of the cable causes the cutting blade to move between the cutting position and the noncutting position.

20. A cutting tool according to claim 18, wherein the driving means comprises a plurality of cams.

21. An ornamental turning device comprising:
- a shaft adapted to receive a chuck at a first end and being rotatable about an axis of rotation;
- a tool for engraving an object attachable to the chuck and comprising a reciprocating blade;
- a driving cog connected to the shaft; and
- tool drive means driveably connected to the shaft of the driving the tool, the drive means comprising:
  - a driven cog driveably connected to the driving cog;

a plurality of cams, each rotatable with the driven cog and each comprising a plurality of lobes;

a moveable cam follower adapted to follow the surface of any one of the plurality of cams; and means for connecting the tool to the cam follower, whereby reciprocation of the blade is determined by the movement of the cam follower over the cam surface and whereby in use, the rate at which the blade reciprocates is proportional to the rotational speed of the shaft, and whereby when the cam follower tracks a lobe surface of the cam, the tool is in contact with an object to be worked, and when the cam follower tracks a non-lobe surface, the tool is out of contact with the object.

22. An ornamental turning device according to claim 21 wherein each of the plurality of cams is out of phase with each other of the plurality of cams.

* * * * *